United States Patent
von Wimmerspeg

(10) Patent No.: US 6,819,113 B2
(45) Date of Patent: Nov. 16, 2004

(54) PRECISION GRID SURVEY APPARATUS AND METHOD FOR THE MAPPING OF HIDDEN FERROMAGNETIC STRUCTURES

(75) Inventor: Udo von Wimmerspeg, Bellport, NY (US)

(73) Assignee: Brookhaven Science Associates, Upton, NY (US)

( * ) Notice: Subject to any disclaimer, the term of this patent is extended or adjusted under 35 U.S.C. 154(b) by 0 days.

(21) Appl. No.: 10/190,114

(22) Filed: Jul. 8, 2002

(65) Prior Publication Data
US 2004/0004480 A1 Jan. 8, 2004

(51) Int. Cl.[7] .............................. G01V 3/15; G01C 3/08
(52) U.S. Cl. ..................... 324/345; 324/348; 324/326; 356/3.01; 356/4.01
(58) Field of Search ................................ 324/326, 348, 324/323, 345; 356/3.08, 3.01, 3.02, 3.09, 4.01, 5.01, 9, 141.2–141.3, 622, 623

(56) References Cited

U.S. PATENT DOCUMENTS

| | | | |
|---|---|---|---|
| 3,588,249 A | 6/1971 | Studebaker | 356/4 |
| 4,030,832 A | 6/1977 | Rando et al. | 356/152 |
| 4,727,329 A | 2/1988 | Behr | 324/345 |
| 4,739,262 A * | 4/1988 | Fleetwood | 324/345 |
| 4,936,678 A * | 6/1990 | Gordon et al. | 356/622 |
| 5,000,564 A | 3/1991 | Ake | 356/1 |
| 5,060,913 A * | 10/1991 | Reid | 266/162 |
| 5,467,290 A | 11/1995 | Darland et al. | 364/561 |
| 5,629,626 A * | 5/1997 | Russell et al. | 324/345 |
| 5,666,202 A * | 9/1997 | Kyrazis | 356/614 |
| 5,670,882 A * | 9/1997 | Brandolino et al. | 324/345 |

* cited by examiner

Primary Examiner—Jay Patidar
Assistant Examiner—Darrell Kinder
(74) Attorney, Agent, or Firm—Margaret C. Bogosian

(57) ABSTRACT

The present invention is for a precision grid surveyor having a stationary unit and a roving unit. The stationary unit has a light source unit that emits a light beam and a rotator to project the light beam toward detectors on a roving unit. The roving unit moves over an area to be surveyed. Further the invention is for a method of mapping details of hidden underground iron pipelines, and more particularly the location of bell joints.

8 Claims, 4 Drawing Sheets

PRECISION GRID SURVEY APPARATUS AND METHOD FOR THE MAPPING OF HIDDEN FERROMAGNETIC STRUCTURES

This invention was made with Government support under contract number DE-AC02-98CH10886, awarded by the U.S. Department of Energy. The Government has certain rights in the invention.

BACKGROUND OF THE INVENTION

1. Field of the Invention

The present invention relates to the field of surveying and more particularly to a rapid, automatic and accurate apparatus for surveying grid locations over an area including the mapping details of underground iron pipelines, and more particularly the location of bell joints.

2. Description of the Prior Art

Currently in the art the time of signal arrival, trilateralization, differential time of arrival or other techniques are used to solve for the present location of a mobile station, based on receipt of the transmitted signals and weighting of received signals. A previous patent describing a laser beam measurement system is found in U.S. Pat. No. 5,000,564. This patent describes a laser beam three dimensional measurement system wherein the range of the receiver from the transmitter and the angular position of the receiver are determined by the receiver without interaction of the transmitter. The receiver range is determined trigonometrically by measuring the incident angle of the laser beam at two locations on the receiver.

U.S. Pat. No. 4,030,832 describes a grade rod and method of use in a surveying system employing a laser beam which is rotated in a plane. This surveying system is used for measuring elevation and grades. The grade rod includes a graduated scale on a moveable tape connected with a light detector such that the tape and the detector are automatically controlled in their movement.

While the prior art describes ways to survey a given land location, using therein described apparatii is time consuming. There is interest in the surveying industry to quickly survey a location. The prior art does not use an absolute reference or control for measuring a location. Instruments and methods of the prior art require considerable time to perform accurate measurements. This invention overcomes the time consuming processes of the prior art by allowing for quick data collection of survey points over an area.

Previous methods of seeing objects buried underground include the reflection of microwave photons. The scattering and absorption of photons in this wavelength range due to the covering aggregate, and moisture variations in the ground, leads to poor resolution of details when using ground penetrating radar equipment. In the case of buried iron pipes it is the ferromagnetic nature of this material that offers an alternative possibility of sensing details through the measurement of magnetic fields. This invention provides for a detailed map of the magnetic field with reference to the stationary unit. Hidden ferromagnetic objects and depth information can then be obtained.

SUMMARY OF THE INVENTION

For use in the field, the invention should be rugged and lightweight, and self-contained such that it should not require connection to a power source. Further it should be user-friendly, presenting reliable and accurate information rapidly. The invention provides for a reference unit in place whereby comparisons can be made to establish accurate data, such as survey points to make a grid, temperature measurements, and terrestrial field perturbation measurements including temporal fluctuations.

An object of the present invention is to provide a rapid and accurate means for surveying a location. An apparatus for precision grid surveying has a stationary unit holding a light source unit that emits a light beam. The light source unit has a rotator that projects the light beam toward a roving unit with a photodetector There is a roving unit for moving the photodetector over a plane. The light beam can be a parallel beam or a laser. The rotator rotates the light beam about a vertical axis such that the light beam sweeps in a horizontal plane at a steady angular frequency.

The rotator comprises at least one mirror at 45 degree angle and a motor unit wherein the mirror is rotated by the motor unit.

A first clock is on the roving unit and a second clock is on the stationary unit. The first and second clocks are synchronized such that the time is measured when the light beam is intercepted by a detector, and is referenced to the instantaneous orientation of the mirror.

The roving unit has three photodetectors to intercept the light beam at sequential instances of time. These photodetectors may be non-collinear. The roving unit can be a cart with wheels. The apparatus may further comprise means for measuring the magnitude of the terrestrial magnetic field in two dimensional grid plane and digital means for recording and storing the measurements.

A method of precision grid surveying using the above apparatus comprises the steps of placing the stationary unit outside an area to be surveyed; moving the roving unit across the area such that the detectors detect the light beam; and collecting data from the detection means. The method may further comprise the method of mapping hidden ferromagnetic structures by also measuring magnitude of a terrestrial magnetic field in a two dimensional grid plane at said stationary point and said roving point; subtracting from said roving point magnitude measurement said stationary point magnitude measurement; correcting for a temporal field fluctuation by measuring and subtracting the temporal field fluctuations; recording and storing the measurements by digital means and finding the location and structure of buried ferromagnetic objects by analyzing the measurements for deviations from uniformity.

The instrument is independent of the properties of the covering ground such as inhomogeneities caused by the presence of rocks or moisture or boundaries between clay and sand. Another object of the present invention is to provide a method and instrument which can map details of hidden underground iron pipelines, more particularly the location of bell joints, so as to avoid unnecessary excavations. The instrument is user-friendly, presenting reliable and accurate information rapidly in a form that is directly related to finding the correct place to excavate.

DETAILED DESCRIPTION

Figure 1:
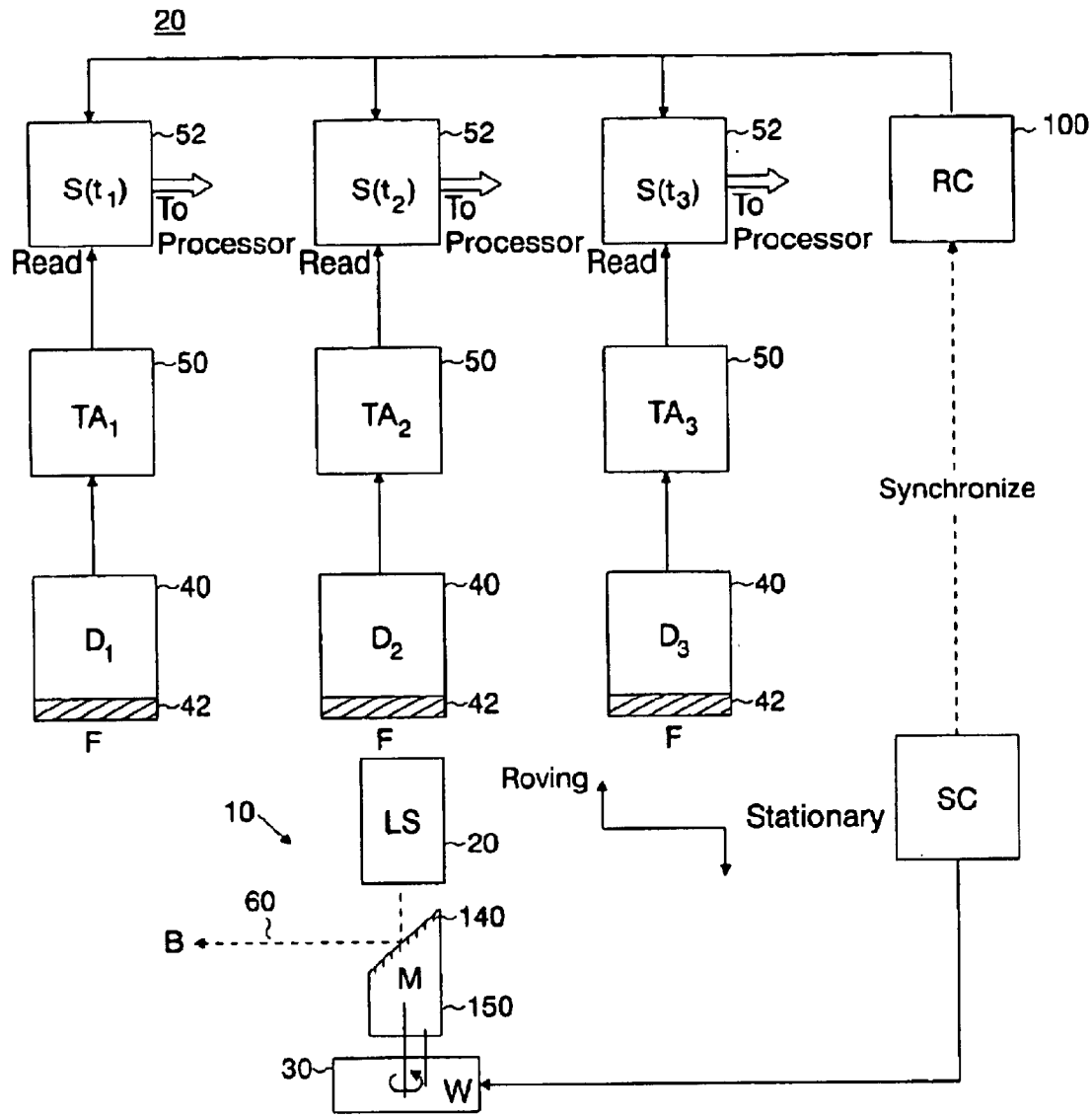
FIG. 1 is a block diagram of the Precision Grid Survey Apparatus.

The crucial requirement for a survey instrument that can locate underground pipelines and survey details such as the position of coupling collars, is that it should save time. Therefore, the need to set up equipment should be eliminated all together. This invention is an instrument that can be walked over the grid or work area, producing and displaying a survey map instantaneously and while the instrument is moving. The developing map display serves as a feedback system, telling the operator where to go to accumulate useful information, rather than to systematically include areas where no useful information is obtained.

According to the present invention, a precision grid survey apparatus consists of two units, a stationary unit 10 and a roving unit 70. The stationary unit 10 sits at one point outside the location area to be measured. The stationary unit 10 has a light source unit 20 for emitting a light beam 60. The light beam 60 maybe a laser beam or any equivalent means of generating light as known in the art. The light source unit 20 contains the optics to generate a beam as known in the art. In the preferred embodiment the light beam 60 is a parallel beam, and more particularly a laser beam.

The light source unit 20 has a rotator 30 for projecting the light beam 60 across a photodetector 40. The rotator 30 may be an electronic motor or any equivalent means. The rotator 30 projects the light beam 60 to be intercepted periodically, once per revolution, by a photodetector 40. The rotator 30 rotates the light beam 60 about a vertical axis such that the light beam 60 sweeps in a horizontal plane at a steady angular frequency. In an example of an embodiment, the rotator 30 is a mirror 140 at a 45 degree angle to the light beam 60 axis and a motor unit whereby the mirror 140 is rotated by a motor unit 150. In the preferred embodiment the rotator 30 rotates the parallel beam about a vertical axis such that the parallel beam sweeps in a horizontal plane at a steady angular frequency.

The roving unit 70 moves a detector 40 over the area to be measured. The roving unit 70 may be a cart, wagon, backpack or any equivalent means that allows the user to easily move the roving unit 70 about the area to be measured. In the preferred embodiment the roving unit 70 is a cart with wheels.

The detectors 40 may be photodetectors or their equivalents. In an example of an embodiment, the detectors 40 have a narrow band pass filter 42 whereby the filter allows only the transmission of the spectral range of the light beam 60.

Figure 2:
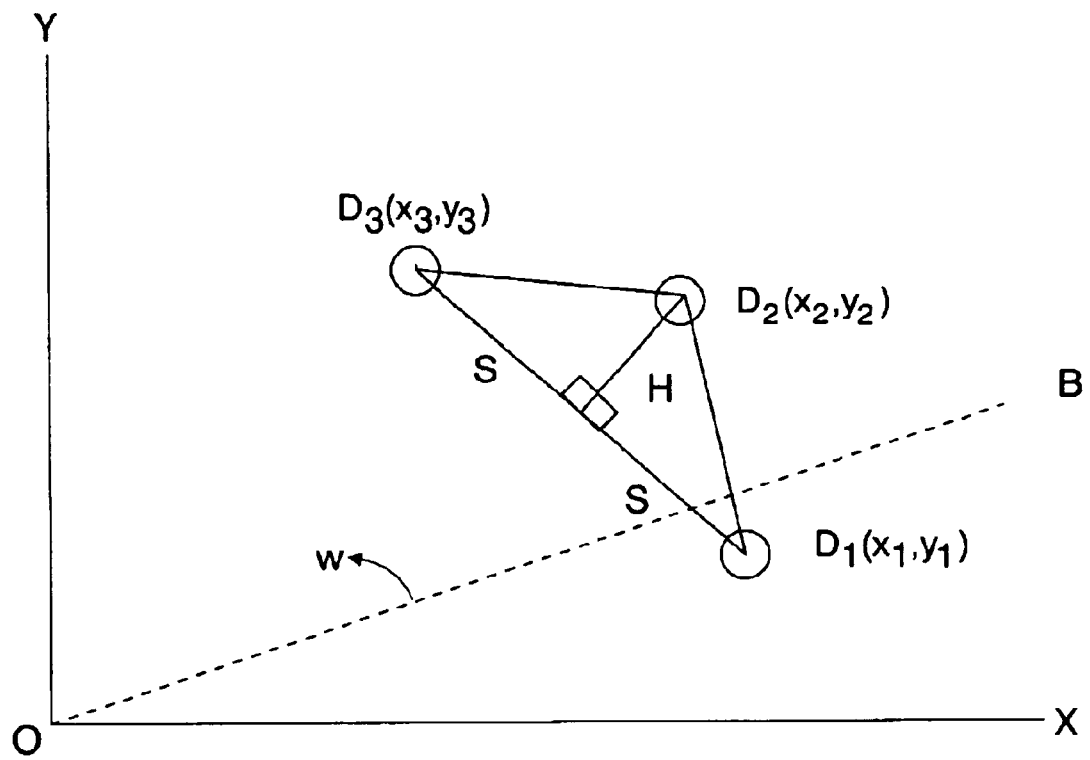
FIG. 2 is a plan view of the typical survey parameters.

In the preferred embodiment, the roving unit 70 carries at least three detectors 40 to intercept the light beam 60 at sequential instances of time. The three detectors 40 will be non-collinear. This allows the orientation and position of a roving unit 70 to be determined, as set out in the example of FIG. 2. $D_i$ represents the roving light-detector array at mutually fixed spacings S and H, located at $(x_i, y_i)$. B represents the light beam emitted from the source at O, and rotating in the plane x,y at fixed angular frequency $\omega$. Let $x_i = \omega(t_i - t_x)/2\pi$, where $t_i$ is the clock count at intercept of $D_i$ and $t_x$ is the clock count when the light beam 60 heads in the x direction. The survey point $(x_2, y_2)$ is where $x_2 = (S^2 + H^2)^{1/2} \cos \alpha_2 \sin[2\alpha_1 + 3\alpha_{2+\alpha 3} - \tan^{-1}(S/H)]/\sin[\alpha_2 - \alpha_1]$ and $y_2 = x_2 \tan \alpha_2$. These calculations are preformed by a control processing unit abroad the roving unit 70.

The sweep velocity of the light beam 60 as detected by each roving unit 70, provides for the determination of the distance from the stationary unit 10. As shown in FIG. 1, the detection means may be composed of a transient analyzer 50 or constant fraction discriminator or other equivalent means known in the art. Also, the time detection means is composed of a scaler 52 and oscillator. The data collected by the detection means is then transferred on to a processor for calculation of the grid map.

In the preferred embodiment the detection means measures the pulse shape of said laser beam on interception by the detector 40, so that the temporal center of the pulse can be calculated.

In the preferred embodiment the apparatus further comprises two clocks. A first clock 100 is on the roving unit 70 and a second clock 110 on the stationary unit 10. The clocks 100, 110 are synchronized such that the time is measured when the light beam 60 hits a detector 40 and referenced to the instantaneous orientation of the rotating mirror 140. The clocks 100, 110 allow for the determination of the relative angles between a reference direction set at the stationary unit 10 and the each detector 40 on the roving unit 70 via the equations above.

A method of precision grid surveying using the apparatus comprises the steps of placing a stationary unit 10 outside an area to be surveyed; moving a roving unit 70 across an area to be surveyed such that at least one photodetector 40 detects the light beam 60; collecting data from the detection means and interpreting data by the processor whereby a survey grid is made. The survey map is used to provide the position of the ferromagnetic object.

While varying magnetic fields are affected by conducting materials, such as metals in general or moist soil through induced electronic or ionic currents respectively, static magnetic fields are specifically affected by ferromagnetic materials. Locally, over distances of tens of meters, the earth's magnetic field is uniform and approximately static. This field is ready-made for sensing the location and structure of buried ferromagnetic objects through the measurement of deviations from uniformity. The advantage of this invention is detailed spatial map of variation of magnetic field with absolute reference to the stationary station. This allows locating hidden ferromagnetic objects, and obtaining depth and size information independently.

The measurement of the scalar magnitude of the magnetic field as a function of position on a two-dimensional map over the ground surface offers a method of underground magnetic detection that could be implemented in a practical way. This method relies on static measurements, making it immune to the nature of the grade materials covering a pipeline, with the exception of the total screening effect due to an intervening iron plate.

Figure 3:
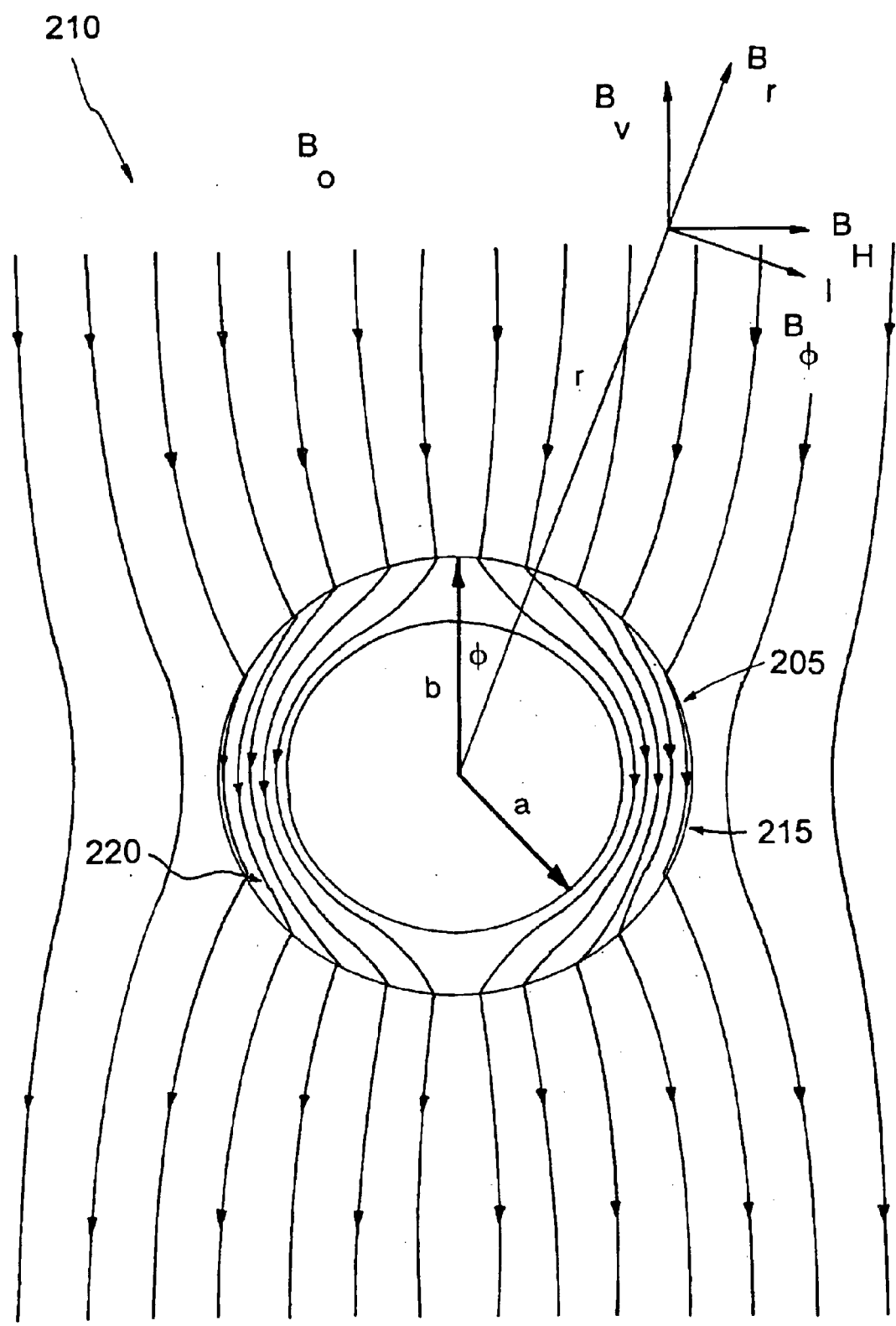
FIG. 3 is a view of the perturbation of the magnetic field about a ferromagnetic object.

FIG. 3 shows the perturbation of a uniform magnetic field 210 in the vicinity of a hollow shell 200 of ferromagnetic material with inner and outer radii a and b respectively. The presence of the ferromagnetic material leads to a reduction of flux density at the positions near the shell 200 located in directions transverse to the field, while a flux density increase occurs in a directions parallel to the field. It is the concentration of magnetic flux 220 within the shell wall 205 that reduces magnetic pressure around the sphere in the direction transverse to the field.

Terrestrial field perturbations in the vicinity of iron objects contain information that can be utilized to determine separately the depth below ground level and the size of these objects. In particular, details such as bell joints in a pipeline could be located by virtue of the change in the outer diameter of the ferromagnetic shell 200.

The measuring of the magnitude of the terrestrial magnetic field in a two dimensional grid plane comprises measuring the magnitude at the roving point in three simultaneous orthogonal directions at each grid point. The method further comprises measuring the magnitude with a magnetometer probe and using the roving unit for moving magnetometer probe across a two dimensional grid plane.

The mapping of the perturbed terrestrial magnetic field B can be performed by measuring the field magnitude over an array of ground surface coordinates, for example in terms of Cartesian positions (x,y):

$$|B(x, y)| = (B_1^2 + B_2^2 + B_3^2)^{1/2}$$

The $B_1$ here refer to the terrestrial magnetic field components as measured by the arbitrarily oriented, but mutually orthogonal, sensors when located at position (x, y). An example is a triaxial orthogonal array of fluxgate magnetometers, which offers mechanical stability and robustness because sufficient sensitivity can be obtained in the form of a small and compact sensor operating at ambient temperature.

For a given dipole D, the field components at (r,Φ), at distances r that are large compared to the dimensions of the dipole, can be written:

$$B_r = 2Dr^{-3} \cos \Phi$$

$$B_{101} = Dr^{-3} \sin \Phi$$

In the case of the dipole induced in the spherical shell shown in FIG. 3, this requirement is met if r>>b. For the shell in question, the dipole is induced by the terrestrial magnetic field $B_o$ can be expressed as $D=kb^3 B_o$ where:

$$k = \frac{(2\mu+1)(\mu-1)(1-x^2)}{(2\mu+1)(\mu+2) - 2(\mu-1)^2 x^3}$$

and x=a/b. The permeability of the ferromagnetic shell is represented by $\mu$.

Figure 4:
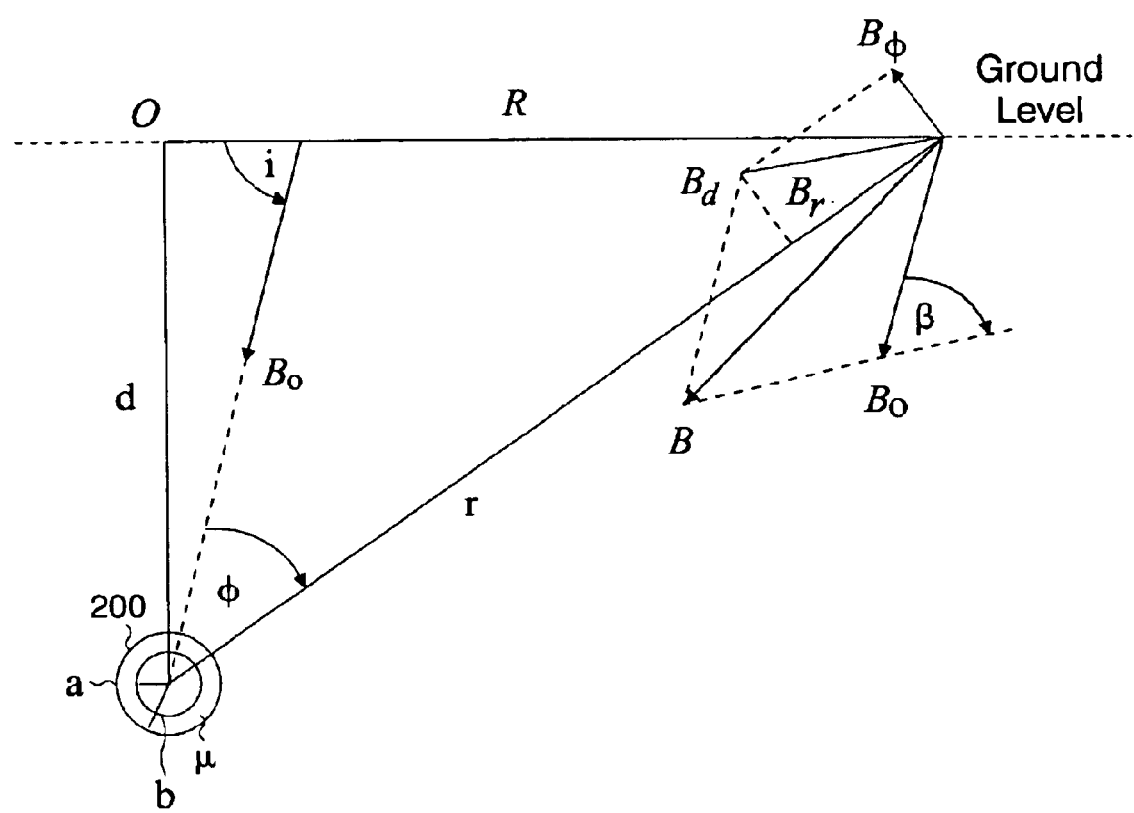
FIG. 4 is a view of ferromagnetic object buried below ground and the magnetic field components.

FIG. 4 shows a simple case of the magnetic field components in the plane containing the vertical through a shell buried at depth d below ground level, and the local terrestrial magnetic field vector with angle of inclination i. The following relations are derived:

$$B = \Phi + \tan^{-1}(\frac{1}{2} \tan \Phi)$$

$$R = d \cot(i-\Phi)$$

$$B_d = Dd^{-3} \sin^3(i-\Phi)(1+3 \cos^2 \Phi)^{1/2}$$

$$B = (B_o^2 + B_d^2 + 2B_d B_n \cos B)^{1/2}$$

The perturbation at ground level at distance R from the origin at O, due to the ferromagnetic shell buried at depth d below the origin, can thus be expressed as the difference between the resultant field B and what the field would have been in the absence of the ferromagnetic material:

$$\partial B(R) = B(R) - B_o(R)$$

where R lies along the magnetic north-south direction, with positive values indicating a position south of the origin.

It is from the measurement of the magnetic field perturbations at ground level, one learns the horizontal position, the size and depth of the ferromagnetic object. The depth below ground level of the ferromagnetic object can be determined directly from the width of the perturbation. The amplitude of the relative magnetic perturbation is a good approximation of a function of the outside dimensions of the object.

The fluxgate magnetometers currently commercially available are capable of operating at normal ambient temperatures, the temperature coefficient of the high permeability core materials used in these detectors requires either temperature stabilization or temperature drift corrections. For a device operating in the field it is cumbersome to provide temperature regulation. Instead, a digital means that relies an array of temperature calibrations furnished to the processor in the form of a permanent look-up table. Corrections can then be implemented through simultaneous temperature measurements taken with a thermistor located at the detector probe.

Over the area of a typical survey of underground piping the noise correlation would be instantaneous since magnetic perturbations spread at the speed of light. A single thermistor probe with a resolution in the range of 10 mK can be used to compensate for all three elements of a triaxial fluxgate array provided that they external thermal insulation is sufficient to prevent significant gradients between elements during sudden changes in ambient temperature as known in the art.

Noise in the terrestrial magnetic field in the form of temporal fluctuations due to changing currents within the molten zones of the earth's interior, as well as such extraterrestrial sources as sunspots, covers a very wide frequency spectrum. Subtraction of temporal component eliminates noise.

$$B(t) = (\Sigma b_1^2(t))^{1/2} - (\Sigma B_i^2(t))^{1/2} \text{ at } (x(t), y(t))$$

Input data to the digital means on the roving cart would consist of six parameters transmitted via radio frequency or its equivalent link from the stationary unit and six from the roving unit. The data would be six magnetometer outputs and six temperature readings, two channels of pulse trains from each of the two shaft encoders and two outputs from a gravitational level sensor. This data could be used to create a map of the survey area for locating ferromagnetic objects.

Although the invention is described herein with reference to the preferred embodiment, one skilled in the art will readily appreciate that other embodiments may be substituted for those set forth herein without departing from the spirit and scope of the present invention. As such, the described embodiments are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. An apparatus for precision grid surveys comprising:
   a. at least one stationary unit comprising
      a light source unit for emitting a parallel laser beam;
      at least one rotator for projecting said parallel laser beam toward at least one photodetector and wherein said rotator rotates said parallel laser beam about a vertical axis such that said parallel laser beam sweeps in a horizontal plane at a steady angular frequency;
   b. at least one roving unit comprising
      a photodetector array for detecting when said parallel laser beam is incident on said at least one photodetector wherein said roving unit is moved about a survey location;
   c. said at least one stationary unit and said at least one roving unit further comprise a first and a second clock wherein said first clock is on said at least one roving unit and said second clock is on said stationary unit wherein said first and said second clocks are synchronized such that the time is measured when said light beam is incident on said at least one photodetector;

means for measuring the magnitude of the terrestrial magnetic field in a two dimensional grid plane;

means for measuring temporal field fluctuations where said measurement of the magnetic terrestrial field is corrected for temporal field fluctuation by measuring and subtracting the temporal field fluctuations and digital means for recording and storing the terrestrial magnetic field measurements and the temporal field fluctuation measurements.

2. An apparatus for precision grid surveys according to claim 1 wherein:
   a. said roving unit has at least three photodetectors to intercept said light beam at sequential instances of time where said at least three photodetectors are non-collinear.

3. An apparatus for precision grid surveys according to claim 1 wherein:
   a. at least one rotator comprises at least one mirror at a 45 degree angle to the light beam axis and a motor unit wherein said mirror is rotated by said motor unit.

4. A method of precision grid surveying using apparatus of claim 1 said method comprises the steps of:
   a. placing said at least one stationary unit outside an area to be surveyed;
   b. moving said roving unit across said area such that said at least one detector detects said light beam;
   c. collecting data from said photodetectors and
   d. interpreting data by a processor to find the orientation of the roving unit.

5. An apparatus for precision grid surveys according to claim 1 wherein at least one roving unit is a cart with wheels.

6. An apparatus for precision grid surveys according to claim 5 wherein said means for measuring the magnitude of the terrestrial magnetic field is a magnetometer probe.

7. A method of mapping hidden ferromagnetic structures according to claim 6 wherein:
   the measuring of the magnitude of the terrestrial magnetic field in a two dimensional grid plane comprises measuring the magnitude at the roving unit in three simultaneous orthogonal directions at each grid point.

8. A method of mapping hidden ferromagnetic structures using the apparatus of claim 6 comprises the steps of:
   a. placing at least one stationary unit outside an area to be surveyed;
   b. moving roving unit across said area such that said at least one photodetector detects said light beam;
   c. collecting data from said detection means;
   d. interpreting data by a processor to find the orientation of the roving unit;
   e. measuring the magnitude of a terrestrial magnetic field in a two dimensional grid plane at a stationary point and a roving point;
   f. subtracting from said roving point magnitude measurement said stationary point magnitude measurement;
   g. correcting for a temporal field fluctuation by measuring and subtracting the temporal field fluctuations from the terrestrial magnetic field measurement;
   h. recording and storing the measurements by digital means and finding the location and structure of buried ferromagnetic objects by analyzing the measurements for deviations from uniformity of the terrestrial magnetic field measurements from the area being surveyed where such deviation would indicate the location of buried ferromagnetic object.

* * * * *

UNITED STATES PATENT AND TRADEMARK OFFICE
CERTIFICATE OF CORRECTION

PATENT NO. : 6,819,113 B2
DATED : November 16, 2004
INVENTOR(S) : Udo von Wimmersperg It is certified that error appears in the above-identified patent and that said Letters Patent is hereby corrected as shown below:

Title page,
Item [75], Inventor, should read -- Udo von Wimmersperg --

Signed and Sealed this

Twelfth Day of April, 2005

JON W. DUDAS
*Director of the United States Patent and Trademark Office*